Nov. 1, 1966  R. J. CARTIER  3,283,091
TIMER WITH ARC SUBTENDING CAM SURFACE
Filed April 28, 1964  3 Sheets-Sheet 1

INVENTOR
ROGER J. CARTIER
BY
Bayard H. Michael
ATTORNEY

Nov. 1, 1966   R. J. CARTIER   3,283,091
TIMER WITH ARC SUBTENDING CAM SURFACE

Filed April 28, 1964   3 Sheets-Sheet 2

INVENTOR
ROGER J. CARTIER
BY Bayard H. Michael
ATTORNEY

INVENTOR
ROGER J. CARTIER
BY
Bayard H. Michael
ATTORNEY

United States Patent Office 3,283,091
Patented Nov. 1, 1966

3,283,091
TIMER WITH ARC SUBTENDING CAM SURFACE
Roger John Cartier, Vimercate, Italy, assignor to Controls Company of America, Melrose Park, Ill., a corporation of Delaware
Filed Apr. 28, 1964, Ser. No. 363,192
10 Claims. (Cl. 200—38)

This invention relates to timers, in particular timers for controlling the operations of domestic laundering apparatus such as a clothes washing machine, or a dish washing machine.

According to the present invention there is provided a timer comprising a programming device, a profiled cam movable in phase with said programming device, a cam follower in engagement with the profile of said cam and coupled to operate a switch, and control means for varying the effective profile of the cam thereby to vary the operation of said switch.

The present invention also provides a timer comprising a programming device, a profiled cam movable in phase with said programming device, said profiled cam having two portions of its profile extending in parallel, a cam follower in engagement with the profile of said cam, a switch connected to said cam follower to be operated thereby, and control means selectively operable to prevent the cam follower from following one of said profile portions.

The present invention further provides a timer comprising a programming device movable in a step-by-step manner at intervals, a cam arranged to rotate in a continuous manner and in phase with the movement of the programming device, said cam having a profiled periphery and a cam channel interconnecting two peripherally spaced portions of said profiled periphery a switch connected to said cam follower to be operated thereby, control means for preventing the cam follower from entering said cam channel, and means operated by said programming device for actuating said control means.

Again, the present invention provides an interval timer comprising a plurality of switches, a plurality of programming cams, means for rotating said cams at intervals to operate said switches sequentially in accordance with the desired programme, a sub-interval cam rotatable in a continuous manner and effecting one revolution during each said interval, said cam having a primary profile portion and a secondary profile portion of a different shape, extending in parallel, a cam follower biased into engagement with the profile of said subinterval cam, a switch connected to said cam follower to be operated thereby, control means operative when actuated to prevent said cam follower from following said primary profile portion of sub-interval cam, the cam follower thereby being constrained to follow the secondary profile portion of the cam, and means carried by one of said programming cams for actuating said control means.

Such a timer is particularly applicable in the case of a washing machine in which it is desired to reverse the direction of rotation of a wash basket periodically during a washing operation but maintain rotation in one direction only during a spin drying operation. Thus if a two position switch is provided to control the direction of rotation of the basket-driving motor, the primary portion of the cam profile can be used to control the movement of the switch blade through neutral to its reverse contacts whilst the secondary profile portion of the cam can maintain the switch blade on its forward contacts, the control means which determine whether the cam follower should follow the primary profile or the secondary profile of the cam being in turn under the control of the timer programming device.

In the washing machine art, the word "inversing" is normally used to describe the action of reversing the direction of rotation of the wash basket during a washing operation, whilst the word "reversing" is frequently reserved for a reversal of the direction of rotation of the wash basket when a change in function of the washing machine takes place. However, no such limitation on the use of the word "reversing" is intended to be imparted herein.

One embodiment of the present invention is illustrated in the accompanying drawings in which.

Figure 1:
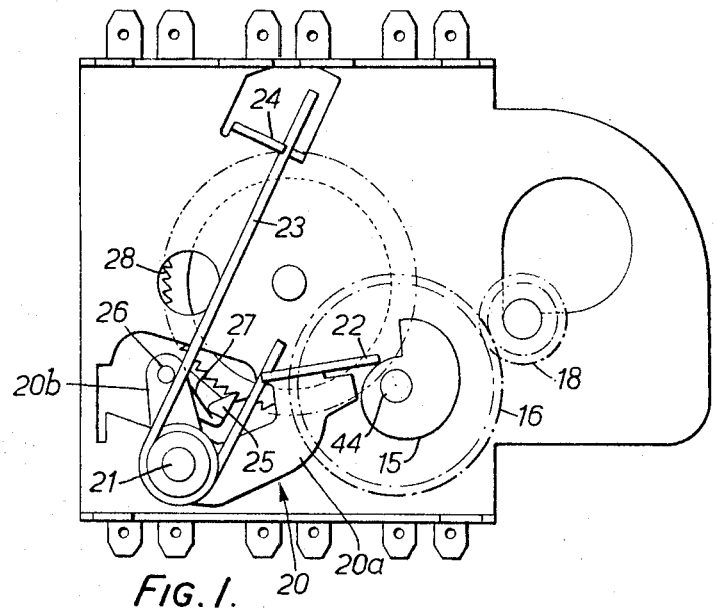
FIGURE 1 is an elevational view of a timer in accordance with the invention, as seen from its front end, with part of the casing removed to show the features of a stepping mechanism.

As shown in the drawings, the timer comprises a programming device in the form of a cam bank 10 formed by a plurality of radial programming cams 11 fixed on a common shaft 12. This shaft is rotated by the stepping mechanism shown in FIGURE 1.

This stepping mechanism comprises a slow rise-fast drop cam 15 mounted on a gear wheel 16 which is driven by a motor 17 via an intermediate gear wheel 18. Reference 19 indicates an alternative position for the motor 17. A bell crank lever 20 is journalled on a pivot 21 and has one arm 20a provided with a cam follower 22 which is maintained in contact with the cam by a spring 23 which is wound round the pivot and has one end bearing on the arm 20a of the bell crank lever whilst the opposite end bears against a fixed stop 24.

The other arm 20b of the bell crank lever supports a pawl 25 which is mounted pivotally thereon at 26 and biased by a spring 27 against the teeth of a ratchet wheel 28 which is fixed to the shaft of the cam bank and serves to drive the cam bank. The function of the slow-rise fast-drop cam is to rotate the bell crank lever in an anti-clockwise direction as the cam follower rides up the slow-rise portion of the cam, the spring 23 being loaded during the movement and the pawl being caused to move backwards over a tooth of the ratchet wheel so that after the cam follower has passed over the cam drop, the release of the bell crank lever permits the loaded spring 23 to drive it in a clockwise direction and cause the pawl to advance the ratchet wheel through a step of one tooth. A more detailed description of the ratchet mechanism and its operation may be found in copending patent application No. 342,469, now Patent Number 3,237,464.

The stepwise rotation of the cam bank causes sequential opening and closing of switches, such as the switch 30 which forms the subject of copending patent application No. 334,215. Thus during each interval between the steps of movement of the cam bank, one or more switches are actuated to control a function of the machine which is programmed by the timer.

Figure 5:
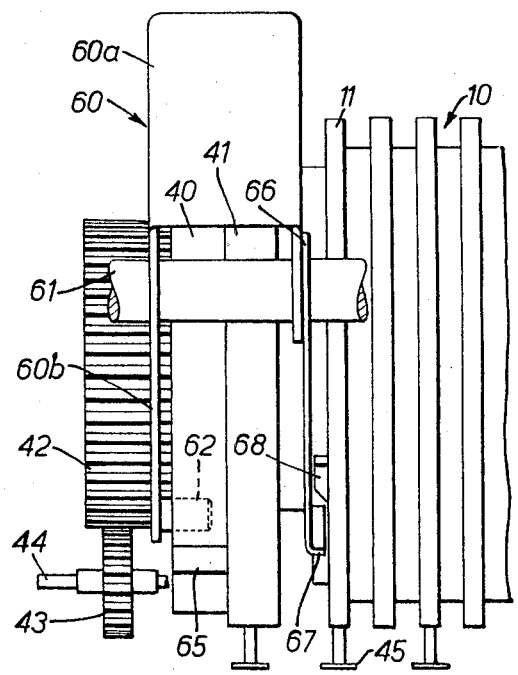
FIGURE 5 is a side view of part of the cam bank as seen in the direction of the arrow B in FIGURE 4 on the same enlarged scale as FIGURE 4.

Frequently however a particular function controlled by the timer does not occupy a fully interval provided by the timer cam bank. Accordingly two further cams 40, 41 (FIGURE 5) are provided at the end of the cam bank which however are not keyed to rotate with the cam bank. These cams, which will hereinafter be referred to as sub-interval cams, are locked to rotate together and support a gear wheel 42 which is rotated by an intermediate gear wheel 43 keyed to the shaft 44 of the slow-rise fast-drop cam 15 of the stepping mechanism, so that the sub-interval cams are in phase with the programming cams 11. Thus the sub-interval cams are rotated in a continuous manner through one revolution during each interval and can be used to control a number of functions during the interval of the cam bank, in particular by the cam 41 acting on one or more switch blades 45 to actuate one or more switches (not shown) connected in circuit with the function controlling switches.

Figure 2:
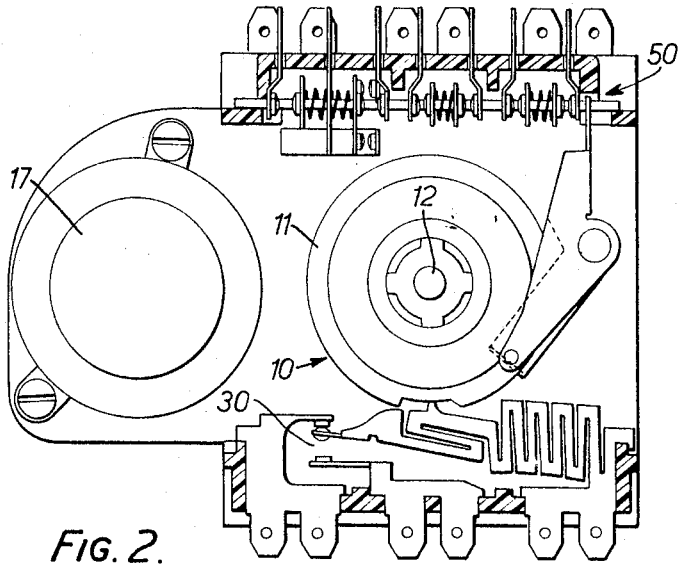
FIGURE 2 is an elevational view of the timer of FIGURE 1 as seen from its opposite end, with part of the casing removed to show a cam bank driven by the stepping mechanism.
Figure 3:
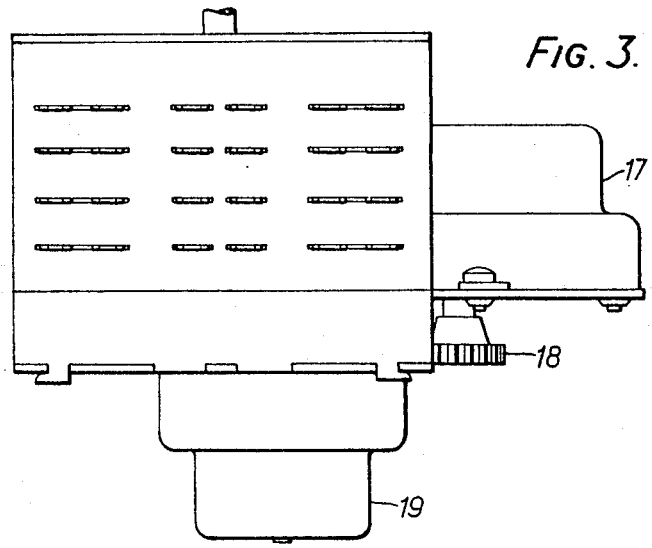
FIGURE 3 is a plan view, part sectioned, of the timer of FIGURE 1.

In the particular form illustrated, the sub-interval cam 40 is designed to actuate an inversor switch 50 (FIGURES 2 and 4) for controlling the direction of rotation of a motor driving the wash basket of a clothes washing machine.

Figure 4A:
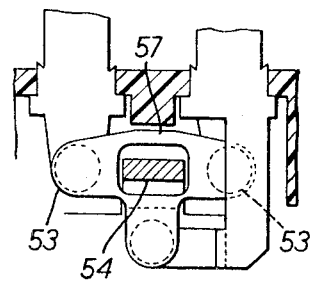
FIGURE 4a being a section on the line A—A in FIGURE 4.

This inversor switch 50, which is described in greater detail in copending patent application No. 337,273 comprises a plurality of pairs of contacts, the fixed contacts 51 being mounted on a common support 52 whilst the movable contacts 53 are mounted on a common longitudinally movable bar 54. The movable contacts are spring-mounted and are arranged to form a first plurality of switches 55 which close sequentially during continued movement of the bar in one direction from a neutral position and open sequentially during continued movement of the bar in the opposite direction towards the neutral position, and a second plurality of switches 56 which close sequentially during continued movement of the bar in said opposite direction after having passed through the neutral position and open sequentially during continued movement of the bar in said one direction back to the neutral position. Each switch comprises two fixed contacts mounted on opposite sides of the bar, and two cooperating movable contacts mounted on a common bridge member 57. As shown in FIGURE 4a, some of the switches comprise a third fixed contact co-operative with a third movable contact mounted on the same bridge. The setting of the contacts in each pair of associated switches 55, 56 enables the inversor switch to be connected to different types of motor or to perform other functions.

The movement of the bar to actuate the inversor switch is effected by a lever 60 keyed on a shaft 61 and having one arm 60a engaging in an aperture 54a in the bar whilst the other arm 60b supports a transverse pin 62 which acts as a cam follower on the sub-interval cam 40, and is held in engagement therewith by a spring, not shown. The sub-interval cam 40 has a substantially circular peripheral cam profile over a major part of its periphery, but over the remaining part of the cam, two alternative cam profiles are provided which extend parallel to one another, these being a primary stepped profile or inner subtending surface defined by a cam channel 65 which extends in a substantially clockwise direction, and a secondary peripheral cam profile which lies along a continuation of the substantially circular major part of the cam profile.

Figure 4:
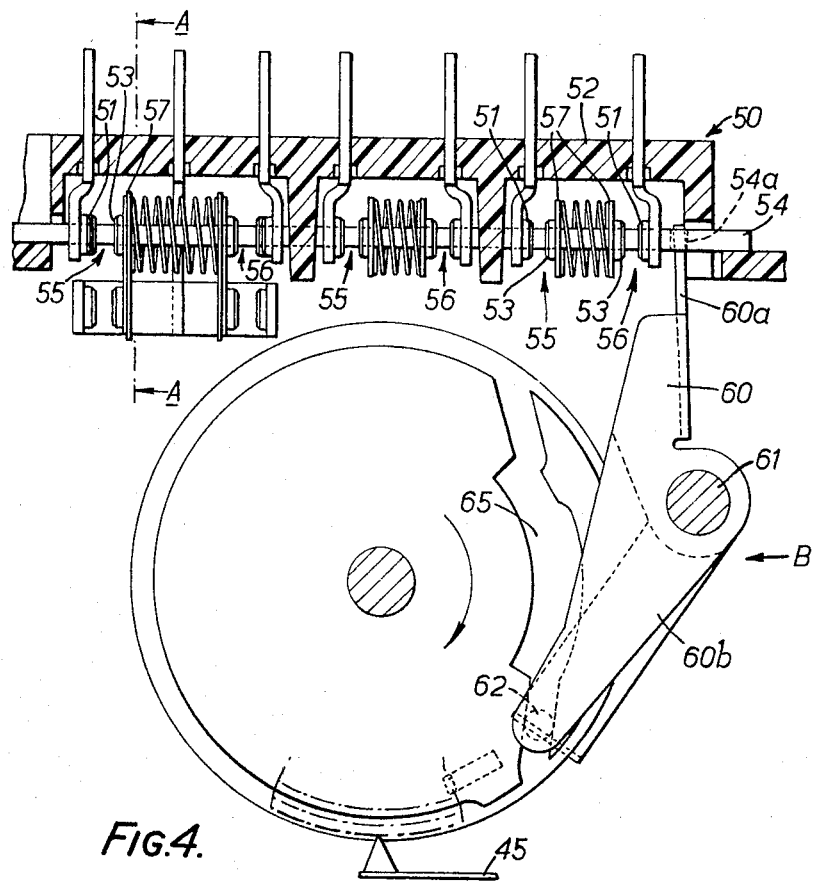
FIGURE 4 is a transverse section through the cam bank showing one of the cams and mechanism operated thereby, on an enlarged scale.

In order to determine whether the cam follower pin should follow the peripheral cam profile or should pass into the cam channel, a second lever 66 fixed to the shaft 61 has at its extremity a cam follower 67 which is engageable with one or more stops 68 formed on the side of the interval cam 11 next adjacent the sub-interval cams. Thus if the cam follower 67 is in engagement with one of the stops 68 as the cam follower pin 62 approaches the entrance of the cam channel, pivotal movement of the lever in the clockwise direction in FIGURE 4 is prevented. Consequently the cam follower pin cannot enter the cam channel and is forced to follow the periphery of the cam.

The lever 60 is so arranged that whilst the cam follower pin 62 is in engagement with the periphery of the cam, the bar 54 is held in the left hand position of FIGURE 4 to maintain the motor rotating in one direction. However as the pin enters the cam channel, the bar is permitted to move into the neutral position to cut out the motor, and thereafter into the right hand position to start the motor rotating in the opposite direction. The second half of the cam channel is a mirror image of the first half and is designed to cause the bar to move back into the neutral position before finally moving into the left hand position as the cam follower pin emerges from the cam channel.

It will thus be seen that in the application of this device to a washing machine, if the cam follower pin is permitted to follow the profile of the cam without restriction, it will ride on the periphery of the cam over a major part of a revolution thus maintaining the motor rotating in one direction and, over the profile of the cam channel, will permit the motor sequentially to stop, start in the reverse direction, stop again and restart in the original direction. This corresponds with a conventional washing sequence.

If however it is desired that the wash basket should be rotated continuously in one direction, for example in spin drying, the programming of the interval cam 11 supporting the stops 68 will be such as to locate a stop under the lever so that as the cam follower pin approaches the cam channel, it will be prevented from entering and will be forced to follow the cam periphery thus maintaining the motor rotating in the same direction.

The sub-interval cams are phased with the interval cams in such a way that the cam follower pin 62 engages the cam periphery whilst stepping of the interval cams occurs.

By means of a knob (not shown) at the left hand end of the cam bank in FIGURE 4, the interval cams can be manually rotated to start a programme at any desired position. Since however the sub-interval cams are not rotatable manually, the danger is avoided of an operator moving the inversor switch quickly to reverse the direction of the motor without allowing it to slow down.

In another system, not shown, the cam follower 67 rides on the periphery of a sub-interval cam forcing the lever in a preferred direction to maintain the motor rotating in one direction for a predetermined number of intervals or length of time.

I claim:
1. An interval timer comprising,
   a plurality of switches,
   a plurality of programming cams,
   means for rotating said cams at intervals to operate said switches sequentially in accordance with the desired programme,
   a sub-interval cam having a primary inner subtending surface and a secondary outer peripheral surface,
   means for rotating said sub-interval cam in a continuous manner in phase with said programming cams,
   a cam follower biased into engagement with the sub-interval cam,
   a switch,
   a coupling connecting said cam follower to said switch,
   control means operative to prevent said cam follower from engaging the primary surface of the sub-interval cam, and
   means carried by one of said programming cams for actuating said control means.
2. An interval timer comprising,
   a plurality of switches,
   a plurality of programming cams,
   means for rotating said cams at intervals to operate said switches sequentially in accordance with the desired programme,
   a sub-interval cam having a primary inner subtending surface and a secondary outer peripheral surface,
   means for rotating said sub-interval cam in a continuous manner through one revolution during each said interval, a cam follower biased into engagement with said sub-interval cam, a control switch having two closed positions and an intermediate open position, a coupling connecting said cam follower to said control switch, control means operative to prevent said cam follower from engaging said primary surface of the sub-interval cam, and constraining the cam follower to engage said secondary surface, and means carried by one of said programming cams for actuating said control means.

3. An interval timer according to claim 2 wherein said secondary surface of the cam is arcuate about the rotary axis of the cam and said primary surface of the cam extends substantially chordwise relative to said secondary surface.

4. An interval timer according to claim 2 wherein said primary surface of the cam is defined by a cam channel.

5. An interval timer according to claim 2 wherein said primary surface of the cam has a downward step and an upward step spaced apart along its length.

6. An interval timer according to claim 2 wherein said means for rotating said sub-interval cam comprises a continuously rotatable motor, and said means for rotating said programming cams at intervals comprise a stepping mechanism driven by said motor.

7. An interval timer according to claim 6 including means permitting said programming cams to be manually rotated independently of the sub-interval cam, said sub-interval cam being only motor-operable.

8. An interval timer according to claim 7 wherein said stepping mechanism comprises a ratchet wheel rotatable with the programming cams, a pawl in engagement with the ratchet wheel, a pawl-carrying lever mounted for reciprocal movement and a slow-rise fast-drop cam rotatable by said motor and in engagement with said lever, the rotation of said sub-interval cam thereby being maintained in phase with the stepping movement of the programming cams.

9. An interval timer comprising
a plurality of switches,
a plurality of programming cams,
a stepping mechanism mechanically coupled to said cams, including a slow-rise fast-drop cam, for rotating said cams at intervals to operate said switches sequentially in accordance with the desired programme,
a continuously rotatable motor in driving engagement with said slow-rise fast-drop cam,
a sub-interval cam having a primary inner subtending surface and a secondary outer peripheral surface and
driven by said motor in a continuous manner in phase with said programming cams,
a cam follower biased into engagement with said sub-interval cam,
a reversing switch, for a motor controlled by the timer,
a coupling connecting said cam follower to said reversing switch,
said sub-interval cam primary surface reciprocates the cam follower to effect reversal of the reversing switch and the secondary profile portion maintains the cam follower in a predetermined position
control means operative to prevent said cam follower from engaging said primary surface of the sub-interval cam, and
means carried by one of said programming cams for actuating said control means.

10. An interval timer according to claim 9 wherein said control means comprise lever means supporting said cam follower and biased to urge said cam follower to engage said primary surface of the sub-interval cam, said means carried by one of the interval cams comprising a projection thereon engageable with said lever means to prevent the cam follower from engaging said primary surface.

References Cited by the Examiner
UNITED STATES PATENTS

| | | | |
|---|---|---|---|
| 2,580,787 | 1/1962 | Johnson | 200—38 X |
| 3,028,458 | 4/1962 | Strathearn et al. | 200—38 |
| 3,168,630 | 2/1965 | Holzer | 200—38 X |

BERNARD A. GILHEANY, *Primary Examiner.*

H. M. FLECK, *Assistant Examiner.*